INVENTOR.
Zdeněk Mack
BY Richard Low
Agent

April 1, 1969 Z. MACK 3,436,684

BRIDGE TYPE DEMODULATOR HAVING DIODES ADJUSTABLY OPERATED

Filed May 4, 1966 Sheet 2 of 3

INVENTOR.
Zdeněk Mack
BY
Richard [illegible]
Ag't

INVENTOR.
Zdeněk Mack
BY
Richard Low
Ag't

United States Patent Office 3,436,684
Patented Apr. 1, 1969

3,436,684
BRIDGE TYPE DEMODULATOR HAVING DIODES ADJUSTABLY OPERATED

Zdeněk Mack, Prague, Czechoslovakia, assignor to Tesla, narodni podnik, Prague, Czechoslovakia Filed May 4, 1966, Ser. No. 547,577
Claims priority, application Czechoslovakia, May 10, 1965, 3,047/65
Int. Cl. H03c *1/54*
U.S. Cl. 332—47 6 Claims

ABSTRACT OF THE DISCLOSURE

Each of the branches of a demodulator bridge circuit comprises a pair of resistors connected in series between a corresponding pair of junctures. At least one capacitor is connected in one of the branches in series with the resistors thereof and between a juncture and one of the resistors. One of the electrodes of each of a plurality of diodes connected to a corresponding one of the branches at a common point in the connection between the two components of the branch. The diodes are connected with each pair thereof connected in series between common points of opposite branches of the bridge circuit connected in opposed polarity relationship. The polarities of the diodes of one pair, connected to the common points, are opposite the polarities of the diodes of the other pair connected to the common points.

The present invention relates to a circuit arrangement by means of which it is possible to adjust the operating point for the nonlinear impedances being crossconnected in a cross modulator or demodulator and in consequence to gain better transmission parameters, e.g. a decreased nonlinear distortion, a variable angle of the opening of the diodes, a convenient adaptability to the monophone reception conditions in stereophony etc.

Known cross modulators are shown in FIGS. 1 and 2. They comprise four nonlinear impedances, e.g. diodes $D_1$ . . . $D_4$, all of them being interconnected by one electrode at a common point, the other electrode of each diode being connected always between two resistors, forming a branch of a bridge. The diodes $D_1$ . . . $D_4$ are poled in the way that the same pole of one pair of the said diodes is connected to one couple of the opposite points in the branches of the bridge and the contrary pole of the second pair of the said diodes is connected to the appropriate couple of the opposite points in the branches of the bridge.

The carrier wave is applied to the junctures *a*, *c* of the bridge formed by the impedances $R_1$ to $R_8$. The modulating signal or modulating signals are applied to the junctures *b*, *d*. The four non-linear impedances $D_1$ to $D_4$ are interconnected at one point V which represents simultaneously also the output from the modulator. If the circuit operates as a synchronous balanced demodulator according to this description, the modulated signal or the both modulated signals are applied to the terminals *b*, *d* and the output is then at the point V. On the other hand the modulated signal can be applied to the point V and the output of demodulated signals is at the points *b*, *d*.

The drawback of both the above mentioned circuit arrangements is that the normal operating point (if the modulation is not applied to the carrier wave) of the diodes is determined by the zero voltage on their characteristics. The opening point adjusted in this way is not always the most convenient. By means of the circuit arrangement according to the invention it is possible to attain either that both diodes get their negative bias resulting in an opening decrease of their angle or that the positive bias is applied to the diodes, the opening angle being increased. By shifting the operating point upon the characteristic it is possible to change the relative value of the individual frequency components on the modulator or demodulator output.

Due to a circuit arrangement in accordance with the invention new and very important properties were gained not available in the original circuit arrangement.

The circuit arrangement is characterized in that at least in one branch of the modulator bridge the non-linear impedance, e.g. diode, is connected to one pole of a DC source through impedances, whereby in one of the adjacent branches another point to which a diode is connected, is joined with the other pole of the DC source through the impedances. The impedances connecting the said two points with the DC source $E_s$ may be also the impedances which form part of the branches of the modulator bridge.

The invention will be best understood from the following specification to be read in conjunction with the accompanying drawings in which:

FIG. 3 illustrates an example of the use of the invention for the cross modulator, the branches of which consist of the impedances $R_1$ and $R_2$ to $R_7$ and $R_8$.

In this case a doublefold use of the circuit arrangement according to the invention is available. The points $X_1$ and $X_2$ within the two branches, in which the diodes $D_1$ and $D_3$ are interconnected, are connected to one pole of the DC source $E_s$ through the impedance $R_x$, whereby the points $Y_1$ and $Y_2$ in the adjacent branches from which the diodes $D_2$ and $D_4$ are supplied are connected to the second pole of the DC source $E_s$ through the impedance $R_y$.

Figure 1:
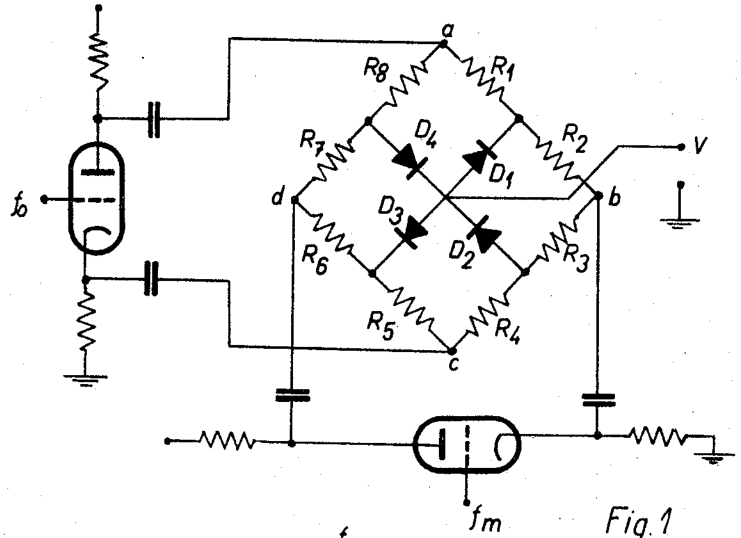
Fig. 1 PRIOR ART
FIGS. 1 and 2 illustrate the known circuit arrangements.
Figure 2:
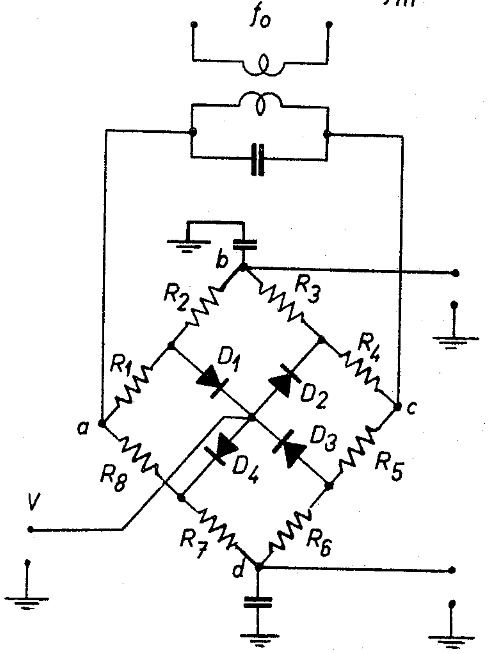
Fig. 2 PRIOR ART
Figure 3:
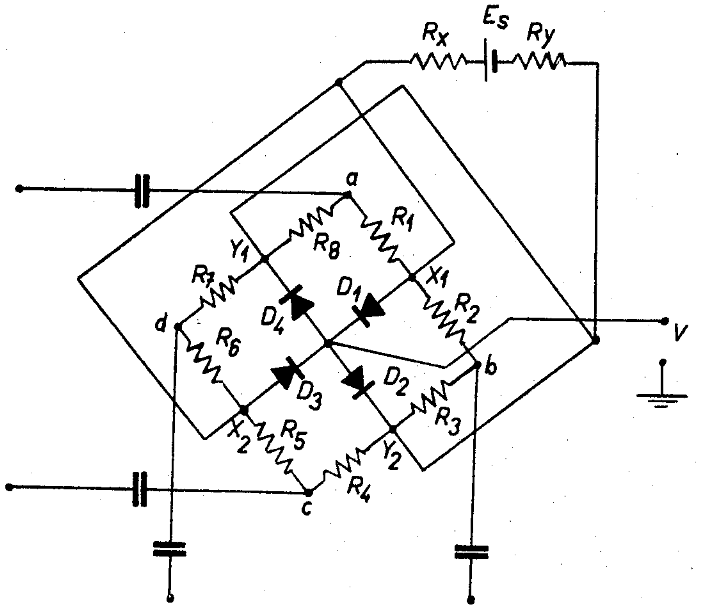
FIG. 3 shows the cross modulator with resistors in the respective branches.
Figure 4:
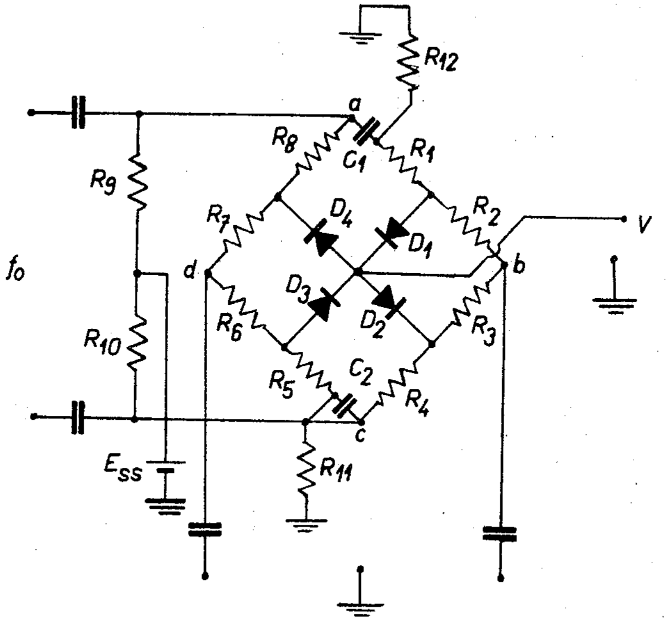
FIG. 4 shows a special circuit arrangement of the modulator.
Figure 5:
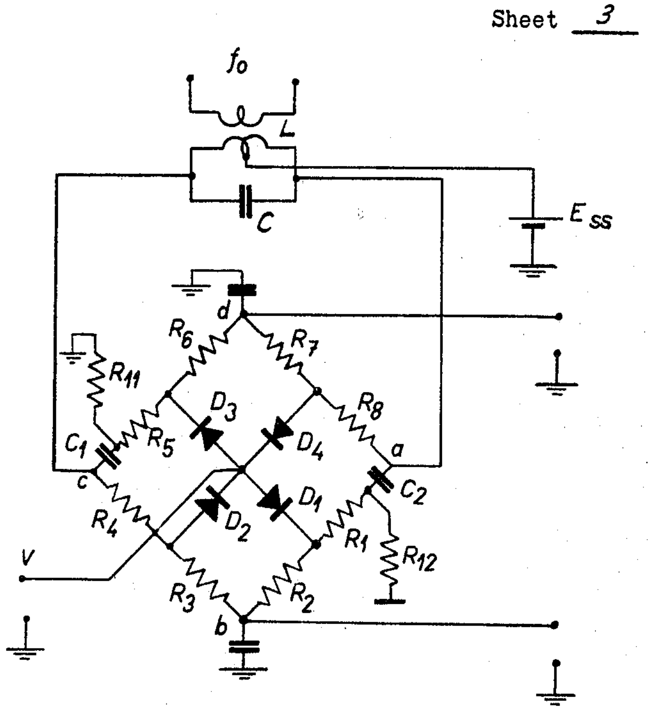
FIG. 5 is similar circuit arrangement to FIG. 4, but is a synchronous demodulator.

FIG. 4 illustrates an arrangement in accordance with the invention when the impedances connecting the bridge points, from which the diodes are supplied, are joined with the DC source and are a part of the modulator bridge branches. Two capacitors $C_1$ and $C_2$ are connected in series with the impedances $R_1$ and $R_5$ forming the modulator bridge. The bridge is divided thereby into two branches with respect to the DC current. The opposite electrodes of both capacitors are connected through the impedances $R_9$ and $R_{10}$ to one pole of the DC source, whereas the two remaining opposite electrodes are connected with the second pole of the DC source through the impedances $R_{11}$ and $R_{12}$. FIG. 5 shows an example of such an arrangement for the synchronous demodulator, where the auxiliary carrier wave is applied to the bridge by means of a tuned circuit consisting of a capacitor C and of an inductor L.

Figure 6:
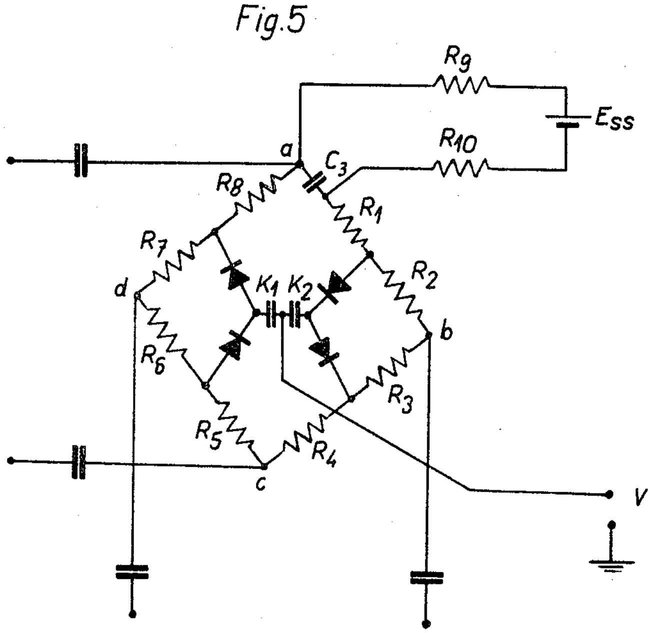
FIG. 6 shows a circuit arrangement with only one capacitor in series with the resistors.

FIG. 6 illustrates an arrangement in accordance with the invention where only one capacitor $C_3$ is connected in series with the impedances $R_1$ and $R_8$. With respect to the DC current the bridge is thus divided at one spot only. One electrode of the capacitor $C_3$ is connected through the impedance $R_9$ with one pole of the DC source $E_{ss}$ and the second electrode through the impedance $R_{10}$ to the second pole of the DC source. The common point of all four diodes is divided with respect to the DC current by one or more capacitors in two parts, e.g. according to FIG. 6 by means of two capacitors $K_1$ and $K_2$. With respect to the AC current, however, all four diodes are interconnected at one common point V.

In the circuit arrangement of FIG. 4, the problem of passing a specific small current through the diodes is solved in the simplest manner. Two DC circuits are provided in the demodulator, so that two DC currents flow. The first current, from the DC voltage source $E_{ss}$, flows through the resistors $R_9$ to the juncture *a*, through the resistor $R_8$, the diode $D_4$, the diode $D_3$, the resistor $R_5$ and the resistor $R_{11}$ to ground. The second current, from the DC voltage source $E_{ss}$, flows through the resistor $R_{10}$ to the juncture *c*, through the resistor $R_4$, the diode $D_2$, the diode $D_1$, the resistor $R_1$ and the resistor $R_{12}$ to ground.

If $R_9=R_{10}$, $R_3=R_4$, $R_2+R_3=R_7+R_6$, $R_1=R_8$ and $R_{12}=R_{11}$, both currents flowing in FIG. 4 provide an identical potential at the common point of connection of the diodes. The pairs of diodes $D_4$, $D_3$ and $D_1$, $D_2$ thus do not need to be separated by capacitors.

If a resonant circiut is connected between a pair of junctures of the bridge, as shown in FIG. 5, the resistors $R_9=R_{10}$ of FIG. 4 may be omitted. In FIG. 5 the DC voltage source $E_{ss}$ is connected to the center of the inductor L of the resonant circuit comprising said inductor and a capacitor C connected in parallel between the junctures *a* and *c*.

In FIG. 6, only one capacitor $C_3$ is connected in a branch of the bridge. There is thus a single DC circuit. The current flows from the DC voltage source $E_{ss}$ through the resistor $R_9$ to the juncture *a*, through the resistor $R_8$, the corresponding pair of diodes, the resistor $R_5$, the resistor $R_4$, the other pair of diodes, the resistor $R_1$ and the resistor $R_{10}$ to the DC voltage source $E_{ss}$. Since a small current flows through the diodes the operating point is shifted from zero and the diodes have a specific defined resistance. If there is no carrier wave, there is no modulation or demodulation distortion.

What I claim is:

1. A demodulator, comprising a plurality of diodes connected with one of the electrodes of each connected to a common point;

a plurality of resistors;

capacitor means comprising at least one capacitor;

a bridge circuit having a plurality of branches and a plurality of junctures, each of said junctures being at the point of intersection of adjacent branches, each of said branches comprising a pair of said resistors connected in series between a corresponding pair of junctures, at least said capacitor being connected in one of said branches in series with the resistors thereof and between a juncture and one of said resistors, the other electrode of each of said diodes being connected to a corresponding one of said branches at a common point in the connection between the two resistors of said branch, said diodes being connected in a manner whereby each pair thereof connected in series between common points of opposite branches of said bridge circuit is connected in opposed polarity relationship, the polarities of the diodes of one pair connected to said common points being oppoiste the polarities of the diodes of the other pair connected to said common points;

impedance means and additional impedance means;

a source of DC voltage having one polarity terminal connected to one electrode of said capacitor via said impedance means and an opposite polarity terminal connected to the other electrode of said capacitor via said additional impdeance means;

means for supplying a modulated carrier wave to the common point of said diodes;

means for providing a carrier wave at a pair of said junctures; and means for providing a demodulated wave at another pair of said junctures.

2. A demodulator as claimed in claim 1, wherein said capacitor means comprises a pair of capacitors, one of which is connected in one of said branches in series with the resistors thereof and between a juncture and one of the resistors of said one of said branches and the other of which is connected in another of said branches in series with the resistors thereof and between an opposite juncture and one of the resistors of said other of said branches.

3. A demodulator as calimed in claim 1, wherein each of said impedance and additional impedance means comprises a resistor, and further comprising a pair of capacitors each connected on a corresponding side of the common point of connection of said diodes in a manner whereby said pair of capacitors are interposed between the diodes of each of said pair of diodes.

4. A demodulator as claimed in claim 2, wherein the junctures to which the capacitors are connected are those at which a carrier wave is provided and each of said impedance means and additional impedance means comprises resistance means having resistors and each terminal of said DC voltage source is connected to each electrode of each of said capacitors via a different resistor of said resistance means.

5. A demodulator as claimed in claim 2, wherein the junctures to which the capacitors are connected are those at which a carrier wave is provided, said impedance means comprises resistance means having resistors, said additional impedance means comprises a resonant circuit connected between the junctures at which said carrier wave is provided and one terminal of said DC voltage source is connected to one electrode of each of said capacitors via a different resistor of said resistance means and the other terminal of said DC voltage source is connected to the other electrode of each of said capacitors via part of said resonant circuit.

6. A demodulator as claimed in claim 5 wherein said resonant circuit comprises an inductor and a capacitor connected in parallel between the junctures at which said carrier wave is provided and the other terminal of said DC voltage source is connected to the other electrode of each of the capaictors via part of the inductor of said resonant circuit.

References Cited

UNITED STATES PATENTS

| | | | |
|---|---|---|---|
| 2,972,117 | 2/1961 | Jarmotz et al. | 328—208 X |
| 3,010,079 | 11/1961 | Straube | 332—47 |
| 3,124,767 | 3/1964 | Pospischil | 332—47 |
| 3,121,843 | 2/1964 | Ule | 328—208 X |

ALFRED L. BRODY, *Primary Examiner.*

U.S. Cl. X.R.

329—50, 166, 204; 328—133, 208; 307—257, 321